United States Patent [19]

Nicholls

[11] 4,012,730
[45] Mar. 15, 1977

[54] DOPPLER DETECTION DEVICE WITH INTEGRATOR SAMPLING MEANS TO INHIBIT FALSE ALARMS

[76] Inventor: David Nicholls, 56 Glen Road, Glen Waverley, Victoria, Australia

[22] Filed: Mar. 25, 1975

[21] Appl. No.: 561,890

[30] Foreign Application Priority Data

Mar. 25, 1974 Australia ............................ 7032/74

[52] U.S. Cl. .......................... 340/258 A; 343/5 PD
[51] Int. Cl.² ........................................ G08B 13/18
[58] Field of Search ....................... 340/258 A, 261; 343/7.7, 5 PD

[56] References Cited

UNITED STATES PATENTS

| | | | |
|---|---|---|---|
| 3,579,220 | 5/1971 | Stevenson, Jr. | 340/261 |
| 3,706,961 | 12/1972 | Sugiura | 340/258 A |
| 3,727,216 | 4/1973 | Antonio | 340/258 A |
| 3,728,721 | 4/1973 | Lee et al. | 340/258 A |
| 3,760,400 | 9/1973 | Galvin et al. | 340/258 A |

Primary Examiner—Glen R. Swann III
Attorney, Agent, or Firm—Finnegan, Henderson, Farabow & Garrett

[57] ABSTRACT

A Doppler detector device includes means for transmitting signals into a field to be protected, means for generating a unit step signal from the Doppler shift signal, means for integrating the unit step signal, means for activating an alarm when the output of the integrating means reaches a predetermined threshold level, and a false alarm inhibitor including means for sampling the integrator output and for resetting the integrator if the output does not reach the predetermined threshold level within a predetermined time. The false alarm inhibitor preferably comprises a level detector connected to the integrator output, a timer connected to and activated by detection of a predetermined signal level by the detector, and a reset current source connected to the integrator input and activated by the timer output, the predetermined signal level of the level detector being substantially lower than the predetermined threshold level.

7 Claims, 3 Drawing Figures

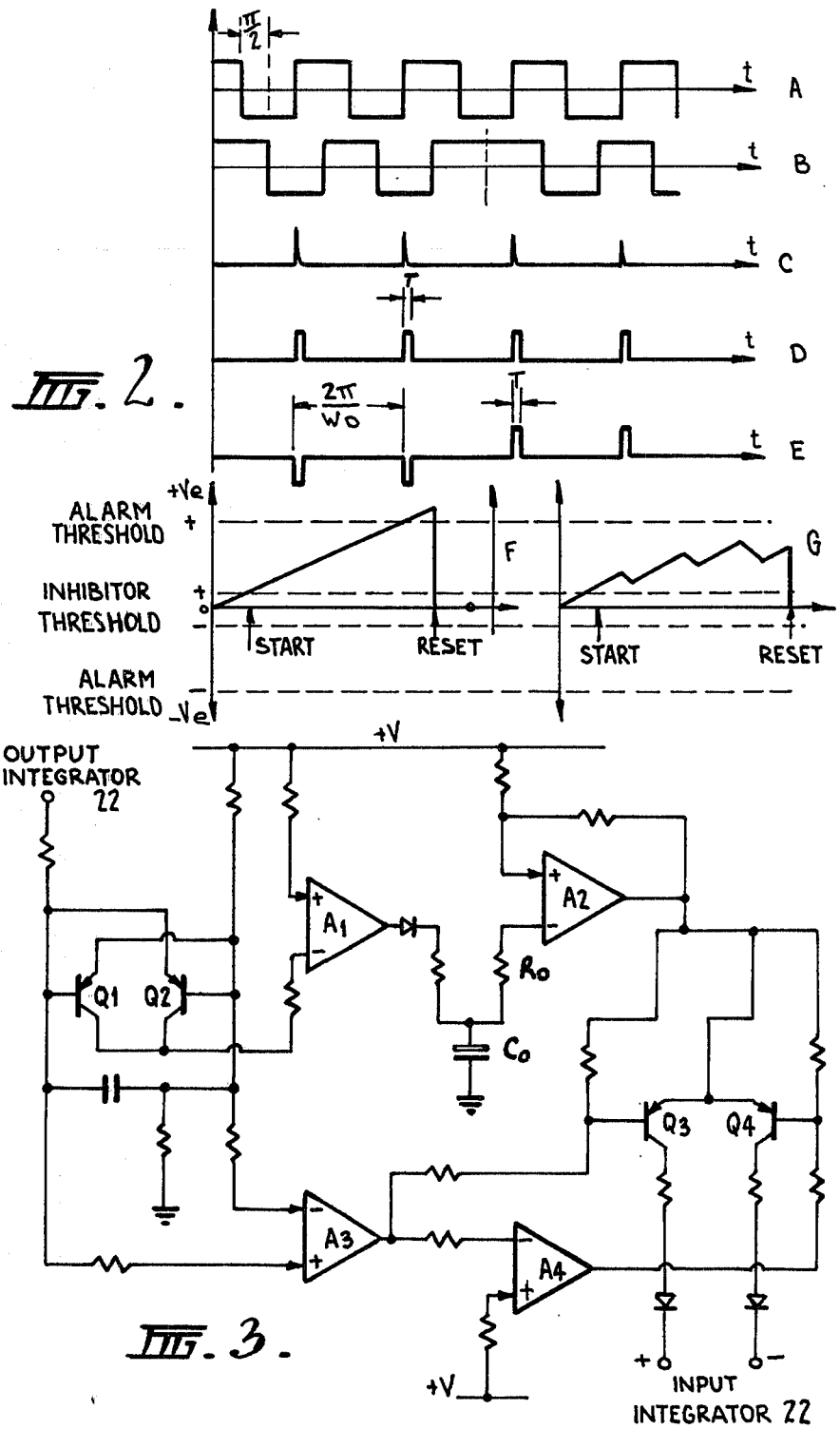

DOPPLER DETECTION DEVICE WITH INTEGRATOR SAMPLING MEANS TO INHIBIT FALSE ALARMS

BACKGROUND OF THE INVENTION

This invention relates to improvements in security devices and more particularly to improvements in electronic detection devices working on the Doppler principle.

Electronic detection devices utilizing the Doppler principle have been widely used for some years. Such devices detect a change in received frequency from the transmitted frequency, the difference being the Doppler shift. Whether the shift is positive or negative it is detected by the device after processing by using an integrator, the output of which reaches an alarm threshold level after a period of time determined by the energy level transferred to the integrator input. While such devices should ignore spurious signals generated by external environmental influences which alter the received signal, they do not always do so thus resulting in the generation of false alarms.

SUMMARY OF THE INVENTION

It is the object of this invention to provide an improved security device in which the likelihood of false alarms is substantially reduced.

The invention provides a security device comprising a Doppler principle detection device, an integrator for integrating the output of the detection device and an alarm adapted to be activated when the output of the integrator reaches a predetermined threshold level, and a false alarm inhibitor including means for sampling the integrator output and for resetting the integrator if the output does not reach said predetermined threshold level within a predetermined time.

In the above arrangement, spurious or random signals containing both positive and negative Doppler shifts have their degree of randomness measured by the false alarm inhibitor for a predetermined time.

The false alarm inhibitor includes a level detector connected to the integrator output, a timer and a reset current source connected to the input of the integrator. Essentially the level detector has a lower threshold level than the level detector of the security device for activating the alarm. This difference should preferably be as large as possible to allow the inhibitor a longer time to monitor the output of the integrator.

In a preferred form of the invention the false alarm inhibitor is applied to an ultrasonic detecting device of the synchronous type employing two phase shifted audio frequency channels. One channel is used as a reference and the phase of the other channel varies by ±90° as the frequency of the received signal varies with respect to the reference. This frequency variation occurs due to the Doppler shift caused by a moving body within the field of the detector.

BRIEF DESCRIPTION OF THE DRAWINGS

A preferred form of the invention will be described with reference to the accompanying drawings in which:

FIG. 2 shows waveforms which graphically illustrate the operation of the system for both real and unreal signals, and FIG. 3 is a circuit diagram of one specific form of the false alarm inhibitor embodying the invention.

DESCRIPTION OF THE PREFERRED EMBODIMENT

Figure 1:
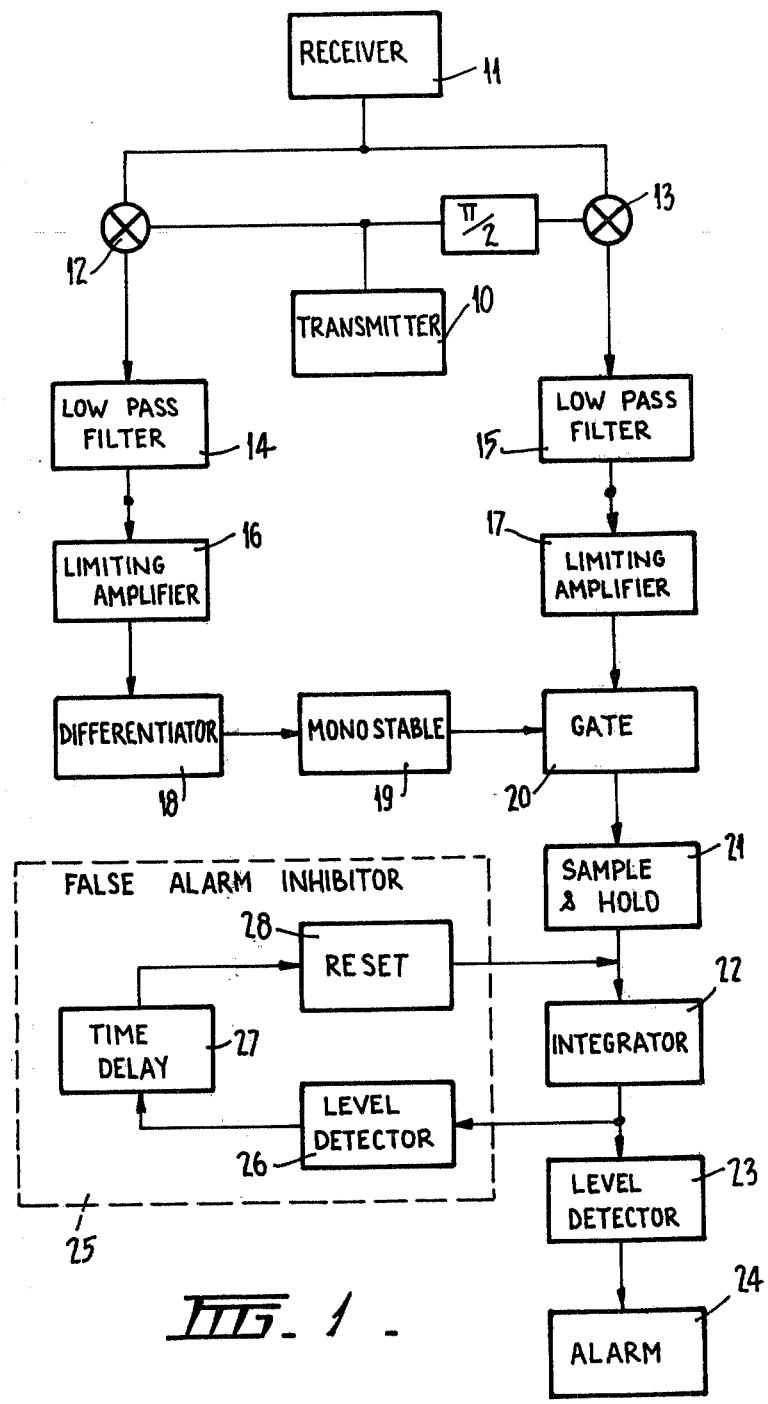
FIG. 1 is a block schematic of an alarm system embodying the invention.

In the preferred form, the false alarm inhibitor embodying the invention is applied to a known synchronous ultrasonic Doppler detection device of the type shown in FIG. 1 of the drawings. The device is a "double ended" system: one in which a signal is used to charge and discharge an integrator feeding a level detector adapted to activate an alarm. However, the inhibitor may be applied to any integrator system in which a threshold level is expected to be reached after a predetermined time in the presence of a real signal.

The Doppler detector system shown includes a transmitter 10 and a receiver 11 connected to quadrature mixers 12 and 13 which produce Doppler output signals that are passed, respectively, through low pass filters 14 and 15 and limiting amplifiers 16 and 17 to produce signals which may be graphically represented as shown in graphs A and B of FIG. 2. It will be noted that the respective signals vary by $\pm \pi/2$ as a result of the Doppler shift caused by a moving body within the field of the detector.

The output signal from amplifier 16 is passed through a differentiator 18 to produce positive pulses as shown in graph C. These pulses are used to trigger a monostable 19 which produces gating pulses as shown in graph D and the gating pulses are applied to gate 20 whereby the output of amplifier 17 is gated to a sample and hold circuit 21 in the form of pulses having a duration T and a period $2\pi/w_o$ where Wo is the Doppler shift. These pulses will be positive or negative depending on the sign of the Doppler shift as shown in graph E.

The sample and hold circuit may be formed by a fast charge slow discharge capacitor and this circuit serves to level out the frequency dependance of the signal. The sample and hold circuit 21 is connected to an integrator 22 which is in turn connected to a level detector 23 adapted to activate an alarm 24 when a moving body is detected. The use of the sample and hold circuit 21 ensures that the input to integrator 22 at least approximates a 'unit step' function so that the time required for the integrator 22 to reach the alarm threshold set by the level detector 23 is constant for real signal conditions.

In accordance with the invention, a false alarm inhibitor circuit 25 is connected to the integrator 22 to reduce the likelihood of the alarm threshold being reached in the presence of an interfering 'unreal' signal in the detector field. In the preferred form shown schematically in FIG. 1, the circuit includes a level detector 26 connected to the output of integrator 22, a time delay circuit 27 and a reset current circuit 28 connected to both the time delay circuit 27 and the input of integrator 22.

The threshold of the level detector 26 is essentially lower than that of detector 23 as shown in graphs F and G of FIG. 2 and this detector serves to start timer 27. When time-out is reached, the reset circuit is activated to reset the integrator 22. Now in the presence of a real signal (graph F), the inhibitor 25 will be overridden since the alarm threshold will be reached before time out of the time delay circuit 27 is reached. However, in the presence of an interfering signal, which characteristically will contain both positive and negative Doppler signals, the integrator 22 will take longer to charge to the alarm threshold and in most cases the integrator will be reset before the alarm threshold is reached as shown in graph G. Thus, the inhibitor serves to monitor the randomness of the Doppler signal by measuring the progress of the integrator 22 once the lower threshold of level detector 26 is passed and the timer 27 begins timing.

One preferred form of circuitry for achieving the necessary functions of the inhibitor is shown in FIG. 3. In the embodiment shown the level detector 26 consists of a voltage window including transistors Q1 and Q2 which detect a change in integrator D.C. level ± 0.5 volt. If the output of integrator 22 goes high by 0.5 volt then Q2 turns on, if low by 0.5 volt, Q1 turns on. In either case additional current is injected into the negative input of Norton amplifier A1 and its output goes low. The time delay circuit capacitor $C_o$ then discharges through $R_o$ until the current into the negative input of amplifier A2 equals the current into the positive input at which time the output of amplifier A2 switches high. The positive feedback around this amplifier gives it a Schmitt trigger action with some hysteresis.

Because the integrator 22 can be high or low, the reset current must know which way to drive the integrator. Therefore a comparator, in the form of amplifier 3, is used to determine the high or low state of integrator and by combining it with an inverter stage, in the form of amplifier 4, the reset current transistors Q3 or Q4 can be driven. The reset currents serve to drive the integrator back toward its mid-voltage until it falls within the window set up by Q1 and Q2. The output amplifier A1 then goes high and recharges $C_o$ driving the output of the Schmitt trigger low thereby disconnecting Q3 and Q4. The diodes D2 and D3 are used to prevent any reverse leakage current in Q3 and Q4 from affecting the performance of the integrator 22.

In the preferred arrangement, the values of $C_o$ and $R_o$ are selected to give a delay of about 3 seconds. Similarly the alarm threshold is set at about 2.5V so the difference between the inhibitor threshold level and the alarm threshold level is about 2.0V. This means that 80 percent of the integrator output is being monitored by the inhibitor. Ideally the higher the percentage the more effective the inhibitor becomes, but under normal practical conditions 80 percent represents a high enough level to allow for component tolerances.

It will be evident that the incorporation of the false alarm inhibitor embodying the invention will substantially reduce the number of false alarms generated. Without the inhibitor, it will be recognised that in many unreal signal situations the signal shown in graph G would reach the alarm threshold level thus generating a false alarm. This problem is at least substantially reduced by the present invention.

I claim:

1. A security device comprising a Doppler principle detection device, means for generating an output signal from a Doppler shift signal developed by the detection device, an integrator for integrating the output signal, an alarm adapted to be activated when the output of the integrator reaches a predetermined threshold level, and a false alarm inhibitor including means for sampling the integrator output and for resetting the integrator if the integrator output does not reach said predetermined threshold level within a predetermined time, said inhibitor acting after said integrator output has reached a predetermined signal level which is lower than said predetermined threshold level.

2. The device of claim 1, wherein said inhibitor comprises a level detector connected to the integrator output, a timer connected to and activated by detection of said predetermined signal level by said detector and a reset current source connected to the integrator input and activated by the timer output.

3. The device of claim 2, wherein said predetermined signal level is of the order of 20 percent of the predetermined threshold level.

4. An electronic detector device comprising means for transmitting signals into a field to be protected, means for receiving signals from said field, means for producing a signal representative of the Doppler shift between said transmitted and received signals, means for generating a signal from said Doppler shift signal, means for integrating said generated signal, means for activating an alarm when the output of said integrating means reaches a predetermined threshold level, and a false alarm inhibitor including means for sampling the integrator output and for resetting the integrator if the output does not reach said predetermined threshold level within a predetermined time, said inhibitor acting after said integrator output has reached a predetermined signal level which is lower than said predetermined threshold level.

5. A device according to claim 4, wherein said inhibitor comprises a level detector connected to the integrator output, a timer connected to and activated by detection of said predetermined signal level by said detector, and a reset current source connected to the integrator input and activated by the timer output.

6. The device according to claim 4, wherein said signal generating means comprises a sample and hold circuit.

7. The device according to claim 5, wherein said predetermined signal level is of the order of 20 percent of the predetermined threshold level.

* * * * *